United States Patent
Fouarge et al.

(10) Patent No.: US 9,050,573 B2
(45) Date of Patent: Jun. 9, 2015

(54) METHOD FOR MONITORING THE LEVEL OF AN ETHYLENE POLYMERIZATION CATALYST SLURRY

(75) Inventors: Louis Fouarge, Dilbeek (BE); Alain Brusselle, Wilrijk (BE)

(73) Assignee: TOTAL RESEARCH & TECHNOLOGY FELUY, Seneffe (Feluy) (BE)

( * ) Notice: Subject to any disclaimer, the term of this patent is extended or adjusted under 35 U.S.C. 154(b) by 408 days.

(21) Appl. No.: 13/514,096

(22) PCT Filed: Dec. 17, 2010

(86) PCT No.: PCT/EP2010/070019
§ 371 (c)(1),
(2), (4) Date: Jun. 6, 2012

(87) PCT Pub. No.: WO2011/073366
PCT Pub. Date: Jun. 23, 2011

(65) Prior Publication Data
US 2012/0242532 A1    Sep. 27, 2012

(30) Foreign Application Priority Data
Dec. 18, 2009   (EP) .................................... 09179859

(51) Int. Cl.
*G01S 13/08*    (2006.01)
*B01J 8/22*     (2006.01)
(Continued)

(52) U.S. Cl.
CPC ............... *B01J 8/228* (2013.01); *B01J 8/0015* (2013.01); *B01J 8/0035* (2013.01); *B01J 2208/0061* (2013.01); *B01J 2208/00769* (2013.01); *C08F 110/02* (2013.01)

(58) Field of Classification Search
CPC ........ B01J 8/228; B01J 8/0035; B01J 8/0015; B01J 2208/0061; B01J 2208/00769; C08F 110/02; G01F 23/284; G01F 23/2962; G01F 25/0061; G01S 13/88; G01S 13/08
USPC .......................................................... 342/124
See application file for complete search history.

(56) References Cited

U.S. PATENT DOCUMENTS 6,838,531 B2 * 1/2005 Reid et al. ........................ 526/71
7,906,597 B2 * 3/2011 Fouarge .......................... 526/64
8,567,243 B2 * 10/2013 Malinovskiy et al. ...... 73/304 C (Continued)

FOREIGN PATENT DOCUMENTS

WO   WO 2004026914 A1 *  4/2004   ............... C08F 2/14
WO   WO 2005077522 A1 *  8/2005   ............... B01J 19/00

OTHER PUBLICATIONS

Cataldo, A; Tarricone, L.; Attivissimo, F.; Trotta, A, "A TDR Method for Real-Time Monitoring of Liquids," Instrumentation and Measurement, IEEE Transactions on, vol. 56, No. 5, pp. 1616,1625, Oct. 2007.*

(Continued)

*Primary Examiner* — John B Sotomayor

(57) ABSTRACT

The present invention relates to a method for monitoring the level of an ethylene polymerization catalyst slurry in a mud pot (2), whereby said catalyst slurry is prepared by introducing a solid catalyst and a liquid diluent in said mud pot (2), and whereby through sedimentation an interface (35) is formed between said diluent and the obtained catalyst slurry, characterized in that said interface (35) is monitored with Time Domain Reflectometry.

13 Claims, 4 Drawing Sheets

(51) Int. Cl.
*B01J 8/00* (2006.01)
*C08F 110/02* (2006.01)

(56) References Cited

U.S. PATENT DOCUMENTS

| | | | |
|---|---|---|---|
| 8,717,222 B2* | 5/2014 | Van Den Berg | 342/22 |
| 2003/0169197 A1* | 9/2003 | McGregor | 342/124 |
| 2004/0169601 A1* | 9/2004 | Haynes | 342/124 |
| 2004/0183718 A1* | 9/2004 | Hagg | 342/124 |
| 2005/0034969 A1 | 2/2005 | Lah et al. | |
| 2007/0034002 A1* | 2/2007 | Reimelt et al. | 73/290 R |
| 2007/0046528 A1* | 3/2007 | Larsson et al. | 342/124 |
| 2007/0090992 A1* | 4/2007 | Edvardsson | 342/124 |
| 2007/0194981 A1* | 8/2007 | Hagg et al. | 342/124 |
| 2008/0039596 A1 | 2/2008 | Fouarge | |
| 2008/0074309 A1* | 3/2008 | Nilsson | 342/124 |
| 2009/0033543 A1* | 2/2009 | Nilsson et al. | 342/124 |
| 2009/0121917 A1* | 5/2009 | Delin et al. | 342/124 |
| 2009/0128395 A1* | 5/2009 | Baath | 342/124 |
| 2009/0212996 A1* | 8/2009 | Chen et al. | 342/124 |
| 2009/0256737 A1* | 10/2009 | Ohlsson | 342/124 |
| 2009/0278730 A1* | 11/2009 | Taylor | 342/124 |
| 2009/0303106 A1* | 12/2009 | Edvardsson | 342/124 |
| 2009/0315758 A1* | 12/2009 | Jirskog | 342/124 |
| 2010/0123614 A1* | 5/2010 | Nilsson | 342/124 |
| 2010/0156702 A1* | 6/2010 | Edvardsson | 342/124 |
| 2010/0231438 A1* | 9/2010 | Ohlsson et al. | 342/124 |
| 2010/0256803 A1* | 10/2010 | Cottard et al. | 700/218 |
| 2011/0093129 A1* | 4/2011 | Nilsson et al. | 700/295 |
| 2011/0109496 A1* | 5/2011 | Van Den Berg | 342/124 |

OTHER PUBLICATIONS

Nemarich, C., "Time domain reflectometry liquid level sensors," Instrumentation & Measurement Magazine, IEEE , vol. 4, No. 4, pp. 40,44, Dec. 2001.*

Gerding, M.; Musch, T.; Schiek, B., "A novel approach for a high precision multi target level measurement system based on time-domain-reflectometry," Microwave Conference, 2005 European , vol. 2, No., pp. 4 pp.,, Oct. 4-6, 2005.*

Cataldo, A; Tarricone, L.; Trotta, A; Attivissimo, F.; Urso, C., "Time Domain Reflectometry Technique for Monitoring of Liquid Characteristics," Instrumentation and Measurement Technology Conference, 2005. IMTC 2005. Proceedings of the IEEE , vol. 3, No., pp. 1932,1936, May 16-19, 2005.*

Gerding, M.; Musch, T.; Schiek, B., "A novel approach for a high-precision multitarget-level measurement system based on time-domain reflectometry," Microwave Theory and Techniques, IEEE Transactions on , vol. 54, No. 6, pp. 2768,2773, Jun. 2006.*

Cataldo, A; Tarricone, L.; Vallone, M.; Attivissimo, F.; Trotta, A, "An Assessment on the Accuracy of Time-Domain Reflectometry for Measuring Level and Permittivity of Liquids," Instrumentation and Measurement Technology Conference, 2006. IMTC 2006. Proceedings of the IEEE , vol., No., pp. 2332,2337, Apr. 24-27, 2006.*

* cited by examiner

METHOD FOR MONITORING THE LEVEL OF AN ETHYLENE POLYMERIZATION CATALYST SLURRY

CROSS-REFERENCE TO RELATED APPLICATIONS

This application claims the benefit of PCT/EP2010/070019, filed Dec. 17, 2010, which claims priority from EP 09179859.5, filed Dec. 18, 2009.

FIELD OF THE INVENTION

The present invention relates to a method for monitoring the level of an ethylene polymerization catalyst slurry and to a mud pot equipped with means for monitoring the level of an ethylene polymerization catalyst slurry in said mud pot. This invention can advantageously be used in chemical manufacturing, specifically in the production of polyethylene.

BACKGROUND OF THE INVENTION

Polyethylene (PE) is synthesized by polymerizing ethylene ($CH_2$=$CH_2$) monomers. Because it is cheap, safe, stable to most environments and easy to be processed polyethylene polymers are useful in many applications. According to the properties polyethylene can be classified into several types, such as but not limited to LDPE (Low Density Polyethylene), LLDPE (Linear Low Density Polyethylene), and HDPE (High Density Polyethylene). Each type of polyethylene has different properties and characteristics.

Ethylene polymerizations are frequently carried out in a loop reactor using ethylene monomer, liquid diluent and catalyst, optionally one or more co-monomer(s), and hydrogen. The polymerization in a loop reactor is usually performed under slurry conditions, with the produced polymer usually in a form of solid particles which are suspended in the diluent. The slurry in the reactor is circulated continuously with a pump to maintain efficient suspension of the polymer solid particles in the liquid diluent. Polymer slurry is discharged from the loop reactor by means of settling legs, which operate on a batch principle to recover the slurry. Settling in the legs is used to increase the solids concentration of the slurry finally recovered as product slurry. The product slurry is further discharged through heated flash lines to a flash tank, where most of the diluent and unreacted monomers are flashed off and recycled.

Alternatively, the product slurry may be fed to a second loop reactor serially connected to the first loop reactor wherein a second polymer fraction may be produced. Typically, when two reactors in series are employed in this manner, the resultant polymer product is a bimodal polymer product, which comprises a first polymer fraction produced in the first reactor and a second polymer fraction produced in the second reactor, and has a bimodal molecular weight distribution.

After the polymer product is collected from the reactor and the hydrocarbon residues are removed, the polymer product is dried, additives can be added and finally the polymer may be extruded and pelletized.

During the extrusion process ingredients including polymer product, optional additives, etc, are mixed intimately in order to obtain a compound as homogeneous as possible. Usually, this mixing is done in an extruder wherein the ingredients are mixed together and the polymer product and optionally some of the additives are melted so that intimate mixing can occur. The melt is then extruded into a rod, cooled and granulated, e.g. to form pellets. In this form the resulting compound can then be used for the manufacturing of different objects.

Polymerization of ethylene involves the polymerization of ethylene monomer in the reactor in the presence of a polymerization catalyst and optionally, if required depending on the used catalyst, an activating agent. Suitable catalysts for the preparation of polyethylene comprise chromium-type catalysts, Ziegler-Matta catalysts and metallocene catalysts. Typically, the catalyst is used in particulate form. The polyethylene is produced as a resin/powder with a hard catalyst particle at the core of each grain of the powder.

Several systems have been disclosed which involve the preparation and the supply of catalyst slurry to a polymerization reaction. In general, for preparing catalyst slurry, a mixture of dry solid particulate catalyst and diluent are apportioned in a catalyst mixing vessel and thoroughly mixed. Then such catalyst slurry is typically transferred to a polymerization reactor for contact with the monomer reactants, generally under high pressure conditions.

It is known in the art that for the production of ethylene polymers having suitable properties it is important during polymerization to control reaction conditions, including reaction temperatures, reactant concentration, etc. Polymerization reactions are also sensitive to the quantity and the type of catalyst utilized. Underdosing of a catalyst leads to an insufficient and uneconomical polymerization process. Overdosing a catalyst may lead to dangerous run-away reactions.

In view of the above, there remains a need in the art for ensuring that an adequate amount of catalyst is made available for the polymerization of ethylene. The present invention aims to provide a method allowing that a catalyst preparation process can be improved further. More in particular, the present invention aims to provide a method for monitoring the level of an ethylene polymerization catalyst in a slurry prepared from a catalyst and a diluent.

SUMMARY OF THE INVENTION

The present invention relates a method for monitoring the level of an ethylene polymerization catalyst slurry in a mud pot, as provided by claim 1. Specifically, the present invention provides a method for monitoring the level of an ethylene polymerization catalyst slurry in a mud pot, whereby said catalyst slurry is prepared by introducing a solid catalyst and a liquid diluent in said mud pot, and whereby through sedimentation an interface is formed between said diluent and the obtained catalyst slurry, characterized in that said interface is monitored with Time Domain Reflectometry. Monitoring the level of an ethylene polymerization catalyst slurry in a mud pot allows the filling level of a catalyst and diluent to be followed during the preparation of said slurry. It also allows that a target value is not surpassed, e.g. the overfilling of diluent in a vessel.

In a second aspect the present invention relates to a mud pot provided with measuring means for monitoring the level of an ethylene polymerization catalyst slurry in said mud pot, as provided by claim 8. This device is advantageous for obtaining more efficient and reliable catalyst preparations in a polyethylene production plant.

These and further aspects and embodiments of the invention are further explained in the following sections and in the claims, as well as illustrated by non-limiting examples.

DETAILED DESCRIPTION OF THE INVENTION

Figure 1:
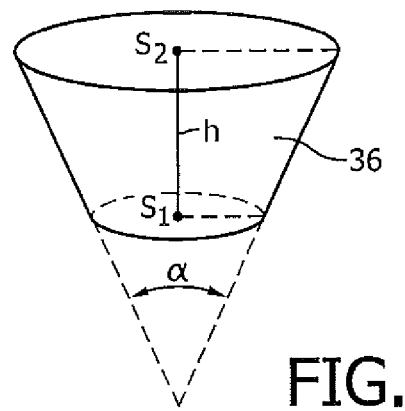
FIG. 1 schematically illustrates a frustoconical shape.

Before the present method and devices used in the invention are described, it is to be understood that this invention is not limited to particular methods, components, or devices described, as such methods, components, and devices may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps.

The terms "comprising", "comprises" and "comprised of" also include the term "consisting of".

The recitation of numerical ranges by endpoints includes all numbers and fractions subsumed within the respective ranges, as well as the recited endpoints.

The term "about" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" refers is itself also specifically, and preferably, disclosed.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, definitions for the terms used in the description are included to better appreciate the teaching of the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to novel a method for monitoring the level of an ethylene polymerization catalyst slurry.

As used herein, the term "monitoring" refers to watching, checking or observing for a special purpose. In the present invention it is especially applicable to the monitoring of a level of a catalyst or a level of a diluent.

As used herein, the term "level" refers to an approximately horizontal line or surface taken as an index of altitude. In the present invention it is especially applicable to the measurement of a substantially horizontal line or surface formed by respectively a solid catalyst and a liquid diluent.

As used herein, the term "ethylene polymerization catalyst slurry" refers to solid particles of ethylene polymerization catalyst comprised in a liquid diluent suitable for the polymerization of ethylene.

As used herein, the term "slurry" refers to a composition comprising catalyst solid particles and a diluent. The solid particles can be suspended in the diluent, either spontaneously or by homogenization techniques, such as mixing. The solid particles can be inhomogeneously distributed in a diluent and form a sediment or deposit. In the present invention it is especially applicable to solid particles of ethylene polymerization catalyst in a liquid diluent. These slurries will be referred to as ethylene polymerization catalyst slurries.

By the term "solid particles" it is meant a solid provided as a collection of particles, such as for instance a powder or granulate. In the present invention it is especially applicable to a catalyst provided on a carrier or support. The support is preferably a silica (Si) support.

As used herein, the "catalyst" refers to a substance that causes a change in the rate of a polymerization reaction without itself being consumed in the reaction. In the present invention it is especially applicable to catalysts suitable for the polymerization of ethylene to polyethylene. These catalysts will be referred to as ethylene polymerization catalysts. The invention is suitable for supported heterogeneous catalysts. In the present invention it is especially applicable to ethylene polymerization catalysts such as metallocene catalysts and to chromium catalysts.

The term "metallocene catalyst" is used herein to describe any transition metal complexes consisting of metal atoms bonded to one or more ligands. The metallocene catalysts are compounds of Group IV transition metals of the Periodic Table such as titanium, zirconium, hafnium, etc., and have a coordinated structure with a metal compound and ligands composed of one or two groups of cyclopentadienyl, indenyl, fluorenyl or their derivatives. Use of metallocene catalysts in the polymerization of olefins has various advantages. Metallocene catalysts have high activities and are capable of preparing polymers with enhanced physical properties in comparison with the polymers prepared using Ziegler-Matta catalysts. The key to metallocenes is the structure of the complex. The structure and geometry of the metallocene can be varied to adapt to the specific need of the producer depending on the desired polymer. Metallocenes comprise a single metal site, which allows for more control of branching and molecular weight distribution of the polymer. Monomers are inserted between the metal and the growing chain of polymer.

In a preferred embodiment, the metallocene catalyst has a general formula (I) or (II):

$$(Ar)_2MQ_2 \quad (I);$$

or

$$R''(Ar)_2MQ_2 \quad (II)$$

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl (IND), tetrahydroindenyl (THI) or fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_8$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl. Exemplary halogen atoms include chlorine, bromine, fluorine and iodine and of these halogen atoms, fluorine and chlorine are preferred. Exemplary of the alkylene groups is methylidene, ethylidene and propylidene. Exemplary hydrocarboxy groups are methoxy, ethoxy, propoxy, butoxy, and amyloxy. Exemplary of the alkylene groups is methylidene, ethylidene and propylidene.

Illustrative examples of metallocene catalysts comprise but are not limited to bis(cyclopentadienyl) zirconium dichloride ($Cp_2ZrCl_2$), bis(cyclopentadienyl) titanium dichloride ($Cp_2TiCl_2$), bis(cyclopentadienyl) hafnium dichloride ($Cp_2HfCl_2$); bis(tetrahydroindenyl) zirconium dichloride, bis (indenyl) zirconium dichloride and bis(n-butyl-cyclopentadienyl) zirconium dichloride; ethylenebis(4,5,6,7-tetrahydro-1-indenyl) zirconium dichloride, ethylenebis(1-indenyl) zirconium dichloride, dimethylsilylene bis(2-methyl-4-phenyl-inden-1-yl) zirconium dichloride, diphenylmethylene (cyclopentadienyl)(fluoren-9-yl) zirconium dichloride, and dimethylmethylene [1-(4-tert-butyl-2-methyl-cyclopentadienyl)](fluoren-9-yl) zirconium dichloride.

The metallocene catalysts generally are provided on a solid support. The support should be an inert solid, which is chemically unreactive with any of the components of the conventional metallocene catalyst. The support is preferably a silica compound. In a preferred embodiment, the metallocene catalyst is provided on a solid support, preferably a silica support.

The term "chromium catalysts" refers to catalysts obtained by deposition of chromium oxide on a support, e.g. a silica or aluminium support. Illustrative examples of chromium catalysts comprise but are not limited to $CrSiO_2$ or $CrAl_2O_3$.

As used herein, the term "liquid diluent" refers to diluents in liquid form that is in a liquid state, liquid at room temperature. Diluents which are suitable for being used in accordance with the present may comprise but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

By the term "ethylene polymerization" it is meant feeding to a reactor reactants including ethylene monomer, a diluent, a catalyst and optionally a co-monomer, an activating agent and a terminating agent such as hydrogen. A homo-polymer or co-polymer result. The term "co-polymer" refers to a polymer, which is made by linking two different types of in the same polymer chain. The term "homo-polymer" refers to a polymer which is made by linking ethylene monomers, in the absence of co-monomers.

The term "co-monomer" refers to olefin co-monomers which are suitable for being polymerized with ethylene monomers. Co-monomers may comprise but are not limited to aliphatic C3-C20 alpha-olefins. Examples of suitable aliphatic C3-C20 alpha-olefins include propylene, 1-butene, 4-methyl-1-pentene, 1-hexene, 1-octene, 1-decene, 1-dodecene, 1-tetradecene, 1-hexadecene, 1-octadecene and 1-eicosene.

The term "activating agent" refers to materials that can be used in conjunction with a catalyst in order to improve the activity of the catalyst during the polymerization reaction. In the present invention, it particularly refers to an organoaluminium compound, being optionally halogenated, having general formula $AlR^1R^2R^3$ or $AlR^1R^2Y$, wherein $R^1$, $R^2$, $R^3$ is an alkyl having from 1 to 6 carbon atoms and $R^1$, $R^2$, $R^3$ may be the same or different and wherein Y is hydrogen or a halogen.

The inventors have found that solid catalyst particles introduced into a liquid diluent entailed in a mud pot provided a solid-liquid boundary, upon sedimentation of the solid catalyst particles, which was measurable using reflectometry, particularly Time Domain reflectometry, more particularly radar based Time Domain reflectometry. Consequently the level of a catalyst slurry in a mud pot could be monitored with an environmentally friendly, easy to install and operate, measurement technique.

As used herein the term "reflectometry" refers to the measuring of signals reflecting of surfaces. In the present invention, it particularly refers to signals reflecting of a boundary formed by solid catalyst particles in a liquid diluent. More in particular it refers to a boundary formed by sediment of ethylene polymerization catalyst particles in a vessel for preparing a catalyst slurry. A reflectometer is an instrument for measuring the reflectivity or reflectance of reflecting surfaces. By reflectometry it is meant Time Domain reflectometry and Frequency Domain reflectometry. Preferred is Time Domain reflectometry.

As used herein the term "reflecting" refers to the change in direction of a wave front at and between two dissimilar media so that the wave front returns into the medium from which it originated. Common examples include the reflection of light, sound and water waves. In the present invention, it particularly refers to the reflection of electromagnetic energy, particularly low power pulses of electromagnetic energy. By low power it is meant a power of at most 2 Watt, As used herein the term "reflectivity" refers to a measure of the process by which a surface or boundary can turn back a portion of incident radiation into the medium through which the radiation approached. In the current invention, it particularly refers to the degree by which a solid-liquid boundary is able to reflect a beam of electromagnetic energy, particularly a radar beam. In particular, said boundary is between a liquid diluent and a solid catalyst.

In a first aspect the present invention provides a method for monitoring the level of an ethylene polymerization catalyst slurry in a mud pot, whereby said catalyst slurry is prepared by introducing a solid catalyst and a liquid diluent in said mud pot, and whereby through sedimentation an interface is formed between said diluent and the obtained catalyst slurry, characterized in that said interface is monitored with Reflectometry, preferably Time Domain Reflectometry, more preferably radar based Time Domain Reflectometry. In a preferred embodiment a Time Domain Reflectometry technology is used in monitoring the level of a catalyst slurry.

As used herein, the term "mud pot" refers to a storage vessel, or so-called mud tank or mud pot which can hold slurry comprised of solid catalyst and liquid diluent.

As used herein, the term "interface" refers to a surface forming a common boundary between two things such as two objects or liquids or chemical phases. In particular, in the present invention, the term interface refers to the boundary formed by solid catalyst particles sedimented in liquid diluent.

As used herein, the term "sedimentation" refers to deposition of matter by gravitation. Through sedimentation of solid catalyst particles in diluent a deposit or sediment is formed. The terms deposit and sediment can be used interchangeably.

As used herein, the term "Time domain" refers to the analysis of mathematical functions, or physical signals, with respect to time. In the time domain, the signal or function's value is known for all real numbers, in case of continuous time, or at various separate instants in the case of discrete time. Signal changes over time can be depicted by a time domain graph. An oscilloscope is a tool commonly used for visualizing such a time domain graph.

As used herein, the term "Time Domain Reflectometry" refers to the measurement of the elapsed time and intensity of signals reflected on a boundary using a reflectometer. The reflectometer can compute the distance to the boundary.

As used herein, the term "Radar based Time Domain Reflectometry" refers to the measurement of the elapsed time and intensity of radar signals reflected on a boundary using a radar-based time domain reflectometer. The reflectometer can compute the distance to the boundary, making it a useful tool in monitoring the level of an ethylene polymerization catalyst slurry.

In another embodiment the reflectometry technique used may be Frequency Domain Reflectometry.

In an embodiment of the invention, a short rise time pulse is transmitted into a mud pot provided entailing solid catalyst particles sedimented in a liquid hydrocarbon diluent. On encountering the solid catalyst particles, at least part of the signal is reflected. The reflected signal is detected by a receiver. From the receiver the signal is sent to a processing unit for computing the distance to the solid catalyst particle sediment. Because the speed of signal propagation is relatively constant for a given transmission medium, the reflected pulse can be read as a function of length.

In practice, a catalyst slurry is mixed or stirred to provide a homogenous mixture. A homogenous mixture of catalyst in diluent is easy to transfer between vessels. Formation of a sediment is considered avoidable as a sediment is thought of giving rise to clogging and blocking of lines, hence seriously hampering the transport of a catalyst and subsequently prohibiting accurate dosing of a catalyst. The inventors found however, that the formation of a slurry comprising solid catalyst sedimented in a liquid diluent, was not prohibitive of obtaining a catalyst slurry suitable for use in the polymerization of ethylene. The inventors have found that the reflectivity differences between a liquid diluent phase and a phase comprising liquid diluent and sedimented solid catalyst particles, can be used for monitoring the level of ethylene polymerization catalyst. Allowing the catalyst particles to sediment in the diluent provided a boundary with sufficient reflectivity to bounce off electromagnetic radiation. Without being bound to theory, the inventors believe the reflectivity is provided by the metal content of the catalyst particles. A method based on reflectometry was found suitable for monitoring the level of an ethylene polymerization catalyst slurry.

The inventors found that liquid diluent used for preparing a catalyst slurry was sufficiently reflective to at least partially bouncing off a beam of electromagnetic energy, for instance as provided by a radar. The signals provided by the bounced off beam were processable by Reflectometry, more preferably Time Domain Reflectometry, most preferably radar based Time Domain Reflectometry.

In a preferred embodiment of the invention, Time Domain Reflectometry is also used for monitoring the liquid diluent level too. Upon sending a wave of low power electromagnetic pulses into a mud pot comprising a catalyst slurry, meeting of the pulses with the liquid surface will generate a first partial reflection of this wave. The higher the dielectric constant of the diluent, the larger is this reflection. From this reflected wave the liquid diluent level can be calculated. The residual wave will continue until it encounters the above described interface formed by the solid catalyst particles and again partially reflect. From the first reflection the level of liquid diluent level can be calculated. From this second reflection, the solid ethylene polymerization catalyst level can be calculated using this technique. Hence, both changes in the level of ethylene polymerization catalyst and diluent can be monitored. This allows following up the level of liquid diluent and/or solid catalyst when filling up a mud pot for the preparation of a catalyst slurry or when transferring catalyst slurry from the mud pot to a polymerization reactor. The present invention is particularly applicable for monitoring the level of a metallocene catalyst in an isobutane diluent. A metallocene catalyst and isobutane diluent are both sufficiently reflective to allow monitoring of their levels in a mud pot by Reflectometry.

The catalyst slurry is prepared by bringing together a liquid diluent and a solid catalyst in a mixing vessel in a concentration suitable for use in a polymerization reactor. A suitable concentration for use in an ethylene polymerization reaction is preferably comprised between 0.1% and 10%, more preferably comprised between 0.5% and 5%, most preferably between 1% and 3%, expressed in catalyst weight by weight of diluent.

In a preferred embodiment of a method according to the invention, the above mentioned electromagnetic pulses are guided. In a more preferred embodiment said electromagnetic pulses are guided by at least two rigid or flexible conductors. Conductors act as a guide for electromagnetic energy. Guidance of low power electromagnetic pulses by two rigid or flexible conductors provides a guided wave which is stronger than other acoustic or electromagnetic waves. It is insensitive to environmental influences such as from the presence of foam, dust or vapour. Moving in guides at the speed of light as opposed to sound, or as opposed to diffusion in a vessel, makes the wave of electromagnetic pulses insensitive to pressure and temperature variations. A further advantage is the lack of interfering reflections caused by the shape of the mud pot when the electromagnetic pulses are guided.

The present invention is applicable to any slurry polymerization in a liquid medium. The invention is particularly applicable to olefin polymerizations in a liquid diluent in which the resulting polymer is mostly insoluble under polymerization conditions. Most particularly the invention is applicable to any olefin polymerization utilizing a diluent so as to produce a slurry of polymer solids and liquid diluent. Suitable olefin monomers are 1-olefins having up to 8 carbon atoms per molecule and no branching nearer the double bond than the 4-position.

In a preferred embodiment of the invention, the above mentioned catalyst slurry is transferred to an ethylene polymerization reactor. In a preferred embodiment of the invention, the above mentioned catalyst slurry is transferred to an ethylene co-polymerization reactor.

The invention is particularly suitable for the copolymerization of ethylene and a higher 1-olefin such as 1-butene, 1-pentene, 1-hexene, 1-octene and 1-decene. For example, copolymers can be made from ethylene and 0.01 to 10 weight percent, alternatively 0.01 to 5 weight percent, alternatively 0.1 to 4 weight percent higher olefin based on the total weight of ethylene and co-monomer. Alternatively sufficient co-monomer can be used to give the above-described amounts of co-monomer incorporation in the polymer. Suitable diluents for use as the liquid medium in a loop reactor are well known in the art and include hydrocarbons, which are inert and liquid under reaction conditions. Suitable hydrocarbons include isobutane, propane, n-pentane, i-pentane, neopentane and n-hexane, with isobutane being especially preferred.

In a preferred embodiment of the invention, the above mentioned catalyst slurry is transferred to an ethylene polymerization reactor provided with a double loop reactor, more preferably an ethylene polymerization reactor provided with a double loop reactor wherein bimodal polyethylene is prepared.

The present invention is particularly applicable to any ethylene polymerization reaction in a loop reactor. A so-called loop reactor is well known and is described in the Encyclopaedia of Chemical Technology, 3rd edition, vol. 16 page 390. Additional details regarding loop reactor apparatus and polymerization processes may be found in US 2009/0143546. A loop reactor consist of a long pipe, arranged in one or more, typically two loops, each loop being tens of meters high. The diameter of the pipes is typically around 60 cm. Such an arrangement has a large surface area:volume ratio as compared with a conventional flask or tank arrangement. This ensures that there is sufficient surface area to the reaction vessel to allow heat exchange with the outer environment, thus reducing the temperature inside the reactor. This makes it particularly suitable for polymerization reactions which are exothermic and require extensive cooling. The configuration is also advantageous as it provides a lot of room for the installation of a cooling system, usually water jackets. This serves to efficiently carry away heat from the surface of the reactor, to increase the efficiency of cooling.

Loop reactors may be connected in parallel or in series. The present invention is particularly applicable to a pair of loop reactors connected in series. When the two reactors are connected in series, different reaction conditions can be used in the reactors allowing the production of several types of products using the same installation. Bimodal polymers may be produced by producing a high molecular weight polymer fraction in a first loop reactor and a low molecular weight polymer fraction in a second loop reactor.

The present invention is particularly applicable to any ethylene polymerization reaction whereby a catalyst slurry is transferred to a mixing vessel for diluting said catalyst slurry prior to injection into the ethylene polymerization reactor. Use of a mixing vessel allows an initial catalyst slurry to be prepared at a high concentration. This is advantageous for saving space and consequently keeping equipment investments for a polymer plant moderate. Use of a mixing vessel as intermediate between mud pot and polymerization reactor is also advantageous for providing flexibility to the preparation of a catalyst slurry. It can be diluted down to a desired concentration just prior to injection into a reactor. The concentration can easily be adjusted to the requirements of the polymerization reactor at any given time.

In a preferred embodiment of the invention, the above mentioned catalyst slurry is transferred to a mixing vessel for diluting said catalyst slurry to a concentration suitable for use in an ethylene polymerization reactor, preferably an ethylene polymerization reactor provided with a double loop reactor, more preferably an ethylene polymerization reactor provided with a double loop reactor wherein bimodal polyethylene is prepared.

In a preferred embodiment of the invention, the above mentioned solid catalyst has an angle of repose preferably smaller than 38 degrees, more preferably smaller than 30 degrees.

By the term "angle of repose" as used herein, it is meant the maximum angle measured in degrees at which a pile of substantially dry solid catalyst particles retains its slope. The angle of repose may be measured for instance by allowing a quantity of substantially dry solid catalyst particles to form a heap. Slippage of the particles will occur so that a sloping surface is exhibited. The angle of the free surface depends principally upon the nature of the bulks solid used. This angle is reasonably consistent for a given bulk solid and is defined as the "angle of repose". The angle of repose of a bulk solid such as a solid catalyst provides an indication of its flow behaviour as follows, according to Bulk Solids Handling, p31:

| Angle of repose | Flow behaviour |
| --- | --- |
| 25-30 degrees | Very free-flowing |
| 30-38 degrees | Free flowing |
| 38-45 degrees | Fair flowing |
| 45-55 degrees | Cohesive |
| >55 degrees | Very cohesive |

Ethylene polymerization catalysts with the above described angle of repose spontaneously formed a substantially horizontal interface when mixed with a diluent and allowed to sediment. This is advantageous for the monitoring of their level in a mud pot using time domain reflectometry. It allows accurate and reliable readings of the level of polymerization catalyst slurry.

In a preferred embodiment of this invention, the ethylene polymerization catalyst is a free-flowing catalyst. As used herein, the term "free flowing ethylene polymerization catalyst" refers to an ethylene polymerization catalyst which in its substantially dry state has an angle of repose below 40 degrees, more preferably below 50 degrees, most preferably below 60 degrees. Use of a free flowing ethylene polymerization catalyst is advantageous to obtain a free flowing ethylene polymerization catalyst slurry. This facilitates pumping and metering of the slurry and hence catalyst dosing.

Preferably the ethylene polymerization catalyst used in the invention is a metallocene catalyst or chromium based catalyst. This selection is advantageous as they these catalysts in their substantially dry form exhibit a small angle of repose. These catalysts are free flowing. In a preferred embodiment of a method according to the invention, the above mentioned solid catalyst is a free-flowing catalyst, preferably a metallocene catalyst, more preferably a carrier supported metallocene catalyst, even more preferably a silica supported metallocene catalyst, most preferably a silica supported single site metallocene catalyst.

In a preferred embodiment of a method according to the invention, the above mentioned liquid diluent is a hydrocarbon diluent, preferably isobutane. Isobutane is compatible with solvents used in a loop reactor. This is advantageous as removal of the solvent prior to injection of the catalyst into the polymerization reactor is not required.

In a preferred embodiment of a method according to the invention, the above mentioned free flowing catalyst is a metallocene catalyst and the above mentioned liquid diluent is a hydrocarbon diluent, preferably isobutane. This is advantageous as metallocene catalysts mixed with isobutane diluent were found to provide free flowing slurries. They can be easily handled and transported. Isobutane is a relatively cheap solvent. It is relatively easy to remove from polyethylene by isobutane flushing means, due to its relatively low boiling point.

Preferably, diluting of catalyst slurry is obtained by adding diluent to a conduit transferring said catalyst slurry from said mud pot to said mixing tank. This is advantageous as the addition of diluent to a conduit provides cleaning. Rinsing conduits with diluent avoids the settling of catalyst particles in the conduits. This is economically more efficient. It is also safer as it avoids exposure of remaining catalyst particles to air upon opening of the conduits for inspection or repairs.

Preferably, catalyst slurry dilution is obtained by diluting the catalyst slurry from the mud pot by means of hydrocarbon diluent to a concentration between 0.1% and 10% by weight. More preferably the slurry is diluted in a hydrocarbon diluent to a concentration comprised between 0.5% and 5% by weight, more preferred between 1 and 3% by weight. The mixing vessel is preferably provided with a stirrer for maintaining the homogeneity of the slurry. This is advantageous for the stability of the reactor conditions in the polymerization reactor receiving said diluted catalyst slurry. Preferably said diluent for dilution of the slurry from the mud pot is isobutane.

Diluted catalyst slurry is withdrawn from the mixing vessel through one or more conduits and provided through these conduits to a polymerization reactor. Each conduit is provided with a pumping means, which controls the transfer and injection of the catalyst slurry into the reactors. In a preferred embodiment, said pumping means are membrane pumps. Using membrane pumps for transferring a catalyst slurry to a polymerization reactor is advantageous as it allows use of a pressure difference between catalyst slurry vessel and the polymerization reactor. Installation of a lower pressure in the catalyst slurry vessel compared to the polymerization reactor will avoid that catalyst slurry is transferred unnecessary and/or in an uncontrolled manner to the polymerization reactor. This provides a safety means for avoiding run-away reactions in the polymerization reactor.

Preferably, there is continuous flushing of the conduit downstream the membrane pump to the reactor by means of diluent flushing means, preferably isobutane flushing means. The conduit upstream the pump may be flushed discontinuously, by means of isobutane flushing means. Different conduits may be provided for connecting the mixing vessel to the reactor.

The present invention is particularly applicable to operating a pressurized mud pot. A mud pot can be pressurized by blanketing the ethylene polymerization catalyst slurry with an inert gas such as nitrogen. Blanketing of the ethylene polymerization catalyst slurry with an inert gas is advantageous as it avoids that traces of oxygen cause solid catalyst particles to react or sparks cause diluent to explode. Building up a pressure with an inert gas in the mud pot is advantageous as it facilitates the transport of the ethylene polymerization slurry. It provides a piston effect. In a preferred embodiment of a method according to the invention a pressure of between 4 barg and 16 barg is obtained in the above mentioned mud pot by blanketing of said catalyst slurry with nitrogen. In a more preferred embodiment of a method according to the invention, a pressure of between 7 barg and 11 barg is obtained in the above mentioned mud pot by blanketing of said catalyst slurry with nitrogen. In a most preferred embodiment of a method according to the invention, a pressure of around 9 barg is obtained in the above mentioned mud pot by blanketing of said catalyst slurry with nitrogen.

In a second aspect, the invention relates to an ethylene polymerization catalyst slurry preparation device provided with a reflectometer. The present invention provides a device that enables to monitor the level of ethylene polymerization catalyst in a slurry. The device is provided with a monitoring means based on reflectometry, preferably a time domain reflectometer, more preferably a reflex radar level gauge using Time Domain Reflectometry. The device allows the supply of diluent and catalyst to a mud pot in a controlled way. It also allows maintaining diluent, catalyst and catalyst slurry at a desired filling level.

The amount of diluent can be kept at a substantially constant level in the mud pot, preferably between 80% and 90% of the vessel volume. The amount of slurry in the mud pot is kept at a substantially constant level, by constantly refilling the mud pot with a diluent and catalyst, once the level of slurry in the mud pot goes below a suitable level. The device also allows following a decrease or increase of either a catalyst level or a diluent level. This is advantageous prior to emptying the vessel for cleaning. A catalyst can be removed prior to substantially freeing a mud pot from liquid. This is advantageous for operational safety.

Specifically, the present invention provides a mud pot provided with measuring means for monitoring the level of an ethylene polymerization catalyst slurry in said mud pot, characterized in that said measuring means is a reflectometer, preferably a time domain reflectometer, more preferably a radar based time domain reflectometer, such as for instance a reflex radar level gauge. Time domain reflectometers are well-known. They are commercially available.

Preferably, the present invention provides a mud pot provided with measuring means for monitoring the level of an ethylene polymerization catalyst slurry in said mud pot, characterized in that said measuring means is a time domain reflectometer, wherein said mud pot comprises a solid catalyst and a liquid diluent forming through sedimentation an interface between said diluent and the obtained catalyst slurry A reflex radar level gauge for instance may use Time Domain Reflectometry. Generally, a reflex radar level gauge typically comprises a sensor and connection means. Said sensor is for emitting waves of electromagnetic pulses and for detection of waves that bounced off said surface formed by said diluent or bounced off said interface formed by said ethylene polymerization catalyst deposited in said diluent. Said sensor is provided with means for calculating the level of said surface and/or said interface in said mud pot. Reflex radar level gauges are commercially available. A reflex radar level gauge using Time Domain Reflectometry is for instance available from Krohne, Germany. A device according to an embodiment of the invention may be advantageously be used for practicing the method of the invention. It is an environmentally friendly alternative to the use of radioactive sensors.

By the term "radar system" it is meant a system comprising a transmitter that emits microwaves or radio waves. These waves are in phase when emitted, and when they come into contact with an object are scattered in all directions. The signal is thus partly reflected back and it has a slight change of wavelength (and thus frequency) if the target is moving. The receiver is usually, but not always, in the same location as the transmitter. Although the signal returned is usually very weak, the signal can be amplified through use of electronic techniques in the receiver and in the antenna configuration. This enables radar to detect objects at ranges where other emissions, such as sound or visible light, would be too weak to detect.

By the term "mud pot" is meant a vessel for the preparation of a catalyst slurry. Mud pots are well-known in the art. A mud pot as used by the inventors typically has a content for the storage 300 kg of metallocene catalyst.

A mud pot as used in the invention is typically 4.2 m high and has a diameter of typically 0.7 m. In a preferred embodiment of the invention, the above mentioned cylindrical body has a length to width ratio of at least 3, preferably at least 4.

In a preferred embodiment of the invention, a difference between said solid catalyst and said diluent is sufficient for the measurement technique to work. In a more preferred embodiment, said diluent and said solid catalyst differ sufficiently in dielectric constant to allow measurement by reflectometry.

Said connection means is preferably a flange. A reflectometer can be easily installed on a mud pot by means of a flange.

In a preferred embodiment the reflectometer, particularly the radar level gauge, further comprises guiding means. Preferably the guiding means comprise at least two rigid or flexible conductors provided in the form of a tube or a rod for guiding waves of electromagnetic pulses. The guiding means or wave guides can be provided in the form of a two-rod probe, a two-cable probe or in the form of a coaxial probe, comprising a tube and an inner conductor. Guiding means, also called wave guides, are advantageous for suppressing environmental influences. Influences in the environment of said mud pot, caused by for instance turbulence, foam, chemical mists or vapours and changes in the concentration of the slurry, are suppressed. Distortion and/or absorption of the wave by chemical mists and vapours are avoided.

In a preferred embodiment, said tube or said rod is provided with means for vertically extending said tube or said rod form the top of said mud pot into said catalyst slurry. The present invention provides a device which is capable of maintaining a vertical alignment inside said mud pot. The guiding means may comprise a counterweight or mechanical fixing device at the end furthest away from said sensor. In a more preferred embodiment of the invention, the reflectometer, in particular the reflex radar level gauge comprises at least two rigid or flexible conductors provided in the form of a tube or a rod; whereby said tube or said rod vertically extend from the top of said mud pot into said catalyst slurry.

The flange for connecting the device to the mud pot is preferably positioned between the sensor and the guiding means. This configuration provides access the sensor of the reflectometer, in particular, the reflex radar level gauge without having to open said mud pot. The mud pot can be maintained pressurized.

In a preferred embodiment of the invention, the above mentioned means is capable of providing electromagnetic pulses of preferably two nanoseconds, more preferably one nanosecond.

In a preferred embodiment of the invention, the above mentioned measuring means is capable of providing electromagnetic pulses preferably with a power of at most 2 Watt, more preferably at most 1 Watt, most preferably at most 100 mW. A measuring means wherein the power of the transmitted electromagnetic pulse is at most 2 Watt is advantageous as it allows the use of limited power capacity switches in the measuring device. Limited power capacity switches are switches which are restricted to handling low powers, typically below 2 Watt. The advantage of such switches is that they can be made very small, typically without moving parts. Such switches are able to handle very short switching times which allow construction of a time domain reflectometer with a short dead zone. By the term dead zone it is meant the zone in which the distance to be measured is too short to be recorded by the measuring means. This corresponds to the distance covered by the signal transmitted by the measuring means during the time required to switch the switch. The invention provides a mud pot equipped with a time domain reflectometer, wherein the dead zone is preferably between 150 mm and 300 mm. Another advantage is that a low power electromagnetic pulse-based measuring means, whereby said power is at most 2 Watt, allows registering and indicating surface and interface of flammable diluents such as isobutane and a pyrophoric substance such as metallocene catalysts, installed inside hazardous areas.

As used herein the term "pyrophoric substance" refers to a substance that will ignite spontaneously; that is, its auto-ignition temperature is below a temperature of around 25° C. Pyrophoric materials are often water reactive as well and will ignite upon contact with water or humid air. Pyrophoric materials can be handled safely in atmospheres of argon or nitrogen. Many pyrophoric solids are sold as solutions, or dispersions in mineral oil or lighter hydrocarbon solvents.

In a preferred embodiment of the invention, the above mentioned said mud pot has a cylindrical body provided with a frustoconical bottom portion 36, preferably said frustoconical bottom portion has an opening angle α of at most 65°, preferably of about 60°. As used herein the term "frustoconical" refers to a geometric form based on a cone of which the top has been "cut-off", leaving only its base; as represented in FIG. 1. The top has been cut-off by a plane which is horizontal to the base of the cone. The volume V of a frustoconical shape can be calculated using the following formula (Polytechnisch Zakboek, Reed Business Information, 50 e druk, pA2/0.34-35):

$$V = \frac{1}{3}\pi h (S1^2 + S2^2 + S1 \times S2)$$

whereby S1, S2 stand for radius; and h for height
A frustoconical configuration is particularly advantageous for the sedimentation of the solid catalyst particles inside said mud pot and for providing a substantially horizontal interface.

In a preferred embodiment of the invention, the above mentioned mud pot comprises a solid catalyst inlet which is concentric with the central longitudinal axis of said mud pot. A configuration whereby a solid catalyst inlet is located in the centre is advantageous as it provides an optimized distribution of the catalyst in the diluent. A further advantage in comparison to an inlet which is situated closer to a wall of said mud pot is that potential contact with mud pot walls is decreased. The walls may comprise water droplets left behind after cleaning or may give off sparks, leading to hazardous situation in contact with a pyrophoric material such as an ethylene polymerization catalyst.

In a preferred embodiment of the invention, the above mentioned mud pot comprises a liquid diluent inlet in the form of a tube, whereby said tube vertically extends from the top of said mud pot into said catalyst slurry. It is particularly advantageous to supply additional liquid diluent to a mud pot by means of a tube in such a manner that said additional liquid is introduced below the surface formed diluent already present in said mud pot. Potential contact with traces of oxygen above the liquid surface is avoided. Splashing of liquid and turbulences are decreased, improving the settling behaviour of the solid catalyst particles in the diluent, Operational safety is increased.

The conduits are further provided with diluent flushing means, preferably isobutane flushing means, either at the inlet, at the outlet or at both sides of the membrane pumps. Isobutane flushing means enable to flush isobutane through the conduit and to keep the conduits and the pumping means unplugged.

In a preferred embodiment, a Time Domain Reflectometry technology is used in monitoring the level of a catalyst slurry.

EXAMPLES

The above aspects and embodiments are further supported by the following non-limiting examples as illustrated by FIGS. 2-5.

The hereunder described device corresponds to equipment suitable for monitoring the level of an ethylene polymerization catalyst slurry. If two or more (different) catalysts slurries need to be fed to a reactor, two or more devices according to the present invention can be supplied or a catalyst blend can be prepared and supplied using a device according to the present invention. It is also clear that in case two or more reactors are used, one or more devices according to the invention can be used, for the two or more reactors, as desired.

Figure 2:
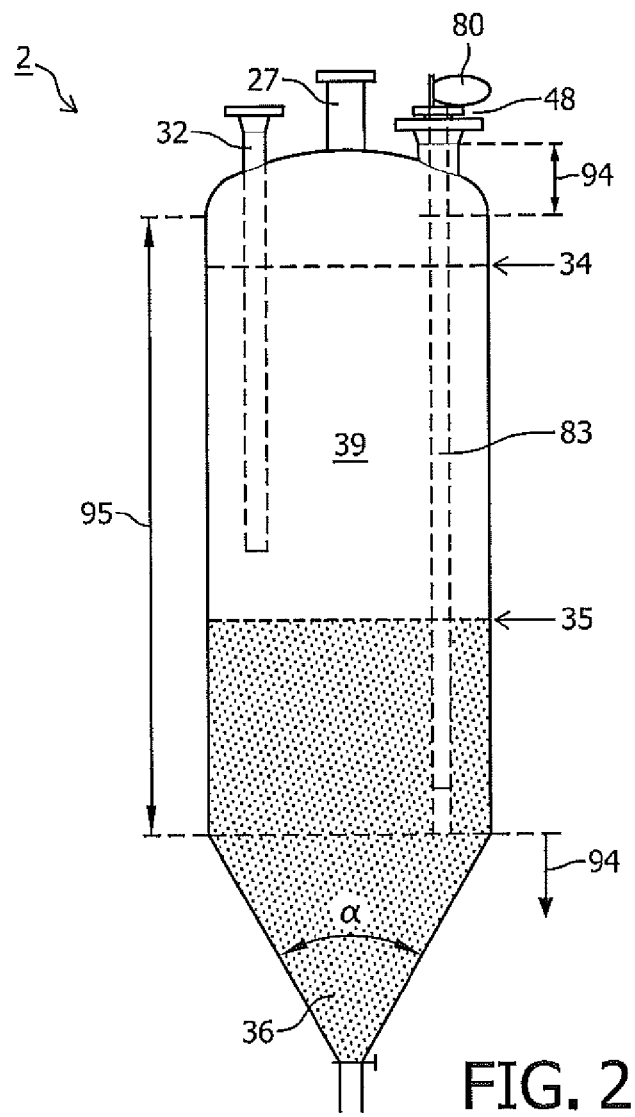
FIG. 2 schematically illustrates a mud pot according to an embodiment of the invention.

Referring to FIG. 2, a preferred device suitable for carrying out the method of the invention is schematically represented. The device comprises a mud pot 2 having a cylindrical body 39 and frustoconical bottom portion 36, provided with a radar level gauge 80. The gauge 80 is arranged to perform measurements of process variables in said mud pot 2, in particular the level of the interface between catalyst and diluent 35 in the mud pot 2. Typically the catalyst has a higher dielectric constant than the diluent. This is the case when using metal-based catalyst. The metal will better reflect the electromagnetic pulses than the diluent. Typically three (or more) materials are contained in said mud pot 2. Typically the first material is a solid, the second material is a liquid and the third material is a gas. Preferably the solid is a catalyst powder or catalyst granules. A preferred choice of liquid is isobutane. The third material is preferably an atmosphere of an inert gas, such as nitrogen. Typically, therefore, the diluent is sufficiently transparent for an electromagnetic pulse so that said electromagnetic pulse may reach the liquid/solid boundary 35.

The gauge 80 may comprise a transceiver (not displayed), controlled by a processor for transmitting and receiving electromagnetic signals. The signals can be DC pulses with a length of about 2 ns or less, with a frequency in the order of MHz, at average power levels in the mW or μW area. Alternatively, the pulses can be modulated on a carrier wave of a GHz frequency.

The radar level gauge system 80 includes a propagation device 83 extending into the mud pot 2, and connected to transceiver circuitry. The propagation device 83 is arranged to act as an adapter, transmitting electromagnetic waves into the mud pot 2 to be reflected by a by an interface between a diluent and ethylene polymerization catalyst 35 in the mud pot 2. The propagation device 83 illustrated in FIG. 2 is a wave guide. Such a wave guide 83 can be a hollow probe suspended between top and bottom of the mud pot, or can be a rigid probe extending into the mud pot. It can be a single or twin rod, a coaxial tube, or any other type of suitable wave guide.

Due to the environment in which the radar level gauge system 80 is used, it is often necessary to provide the power and communication in an intrinsically safe manner. For this purpose, a safety barrier may be provided which ensures that the radar level gauge system 80 is intrinsically safe, i.e. that power, current and voltage are kept below given limits, reducing the risk of hazard.

The transmitted pulses are reflected in the interior of the mud pot 2 e.g. against any surface or interface between different contents, and are fed by the propagation device 83 back to the transceiver. The mud pot signal is then sampled and processed to determine a measurement result based on a relation between the transmitted and received waves. The measurement result is then communicated externally of the radar level gauge by the communication interface. The radar level gauge is calibrated for level measurements within the region indicated with 95 on FIG. 2. Measurements do not cover level fluctuations in a dead-zone in the top 94 and bottom 94 of the mud pot 2.

The liquid diluent inlet 32 is provided in the form of a tube extending into the cylindrical body 39 of the mud pot. A tube for the inlet of catalyst 27 is provided in the middle of the top of the mud pot.

Figure 3:
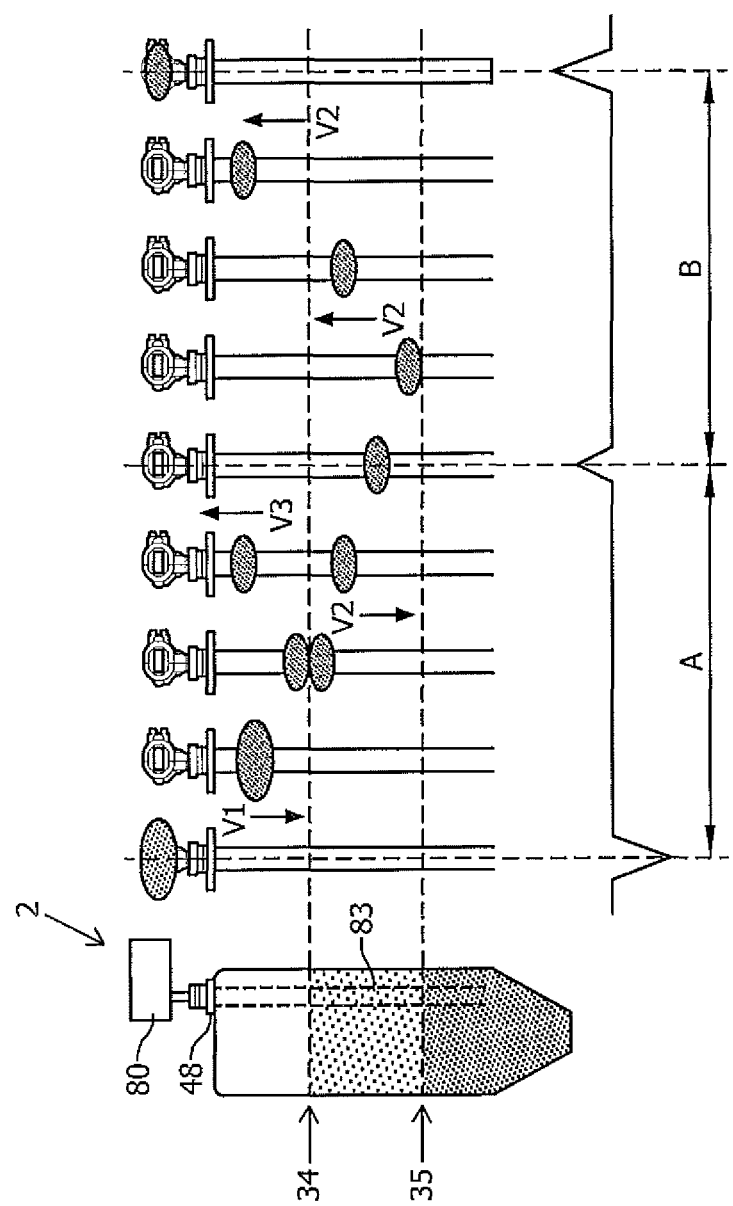
FIG. 3 schematically illustrates the measurement principles of Time Domain Reflectometry for measuring the level of a solid/liquid interface and the level of a liquid/gas interface according to an embodiment of the invention.

Referring to FIG. 3, a preferred embodiment for monitoring the level of an ethylene polymerization catalyst slurry with a reflectometer is schematically illustrated. A mud pot is filled with diluent and a metallocene catalyst in powder form. The mixture is left standing until the solid catalyst particles have sedimented. The mud pot 2 is equipped with a radar level gauge 80. The gauge 80 is positioned on top of the mud pot 2 by means of a flange 48. The gauge is provided with a wave guide. The gauge transmits an electromagnetic pulse V1 into the mud pot. The pulse is guided through the wave guide 83. The pulse is partly reflected by the surface of the diluent 34, preferably isobutane, resulting in an at least partly reflected pulse V3. The remainder of the pulse V2 continues its travel. The remainder of the pulse V2 is reflected by the interface formed by the sedimented catalyst particles 35. A receiver in the gauge detects the signal reflected off the surface of the diluent 34 and off the interface of the catalyst 35. The time delay between emission of the pulse and receipt of the respective reflections is processed by a processing and calculating unit in the gauge 80. The level of the diluent surface and of the catalyst particle interface is obtained from the calculation. The time elapsed between emission of the pulse and receipt of a first at least partially reflected pulse A is indicative of the diluent level 34 (level=time/2). The time elapsed between receipt of the first at least partially reflected pulse and second at least partially reflected pulse B is indicative of the position of the interface, in particular the level of the surface formed by the sedimented catalyst particles 35.

Figure 4:
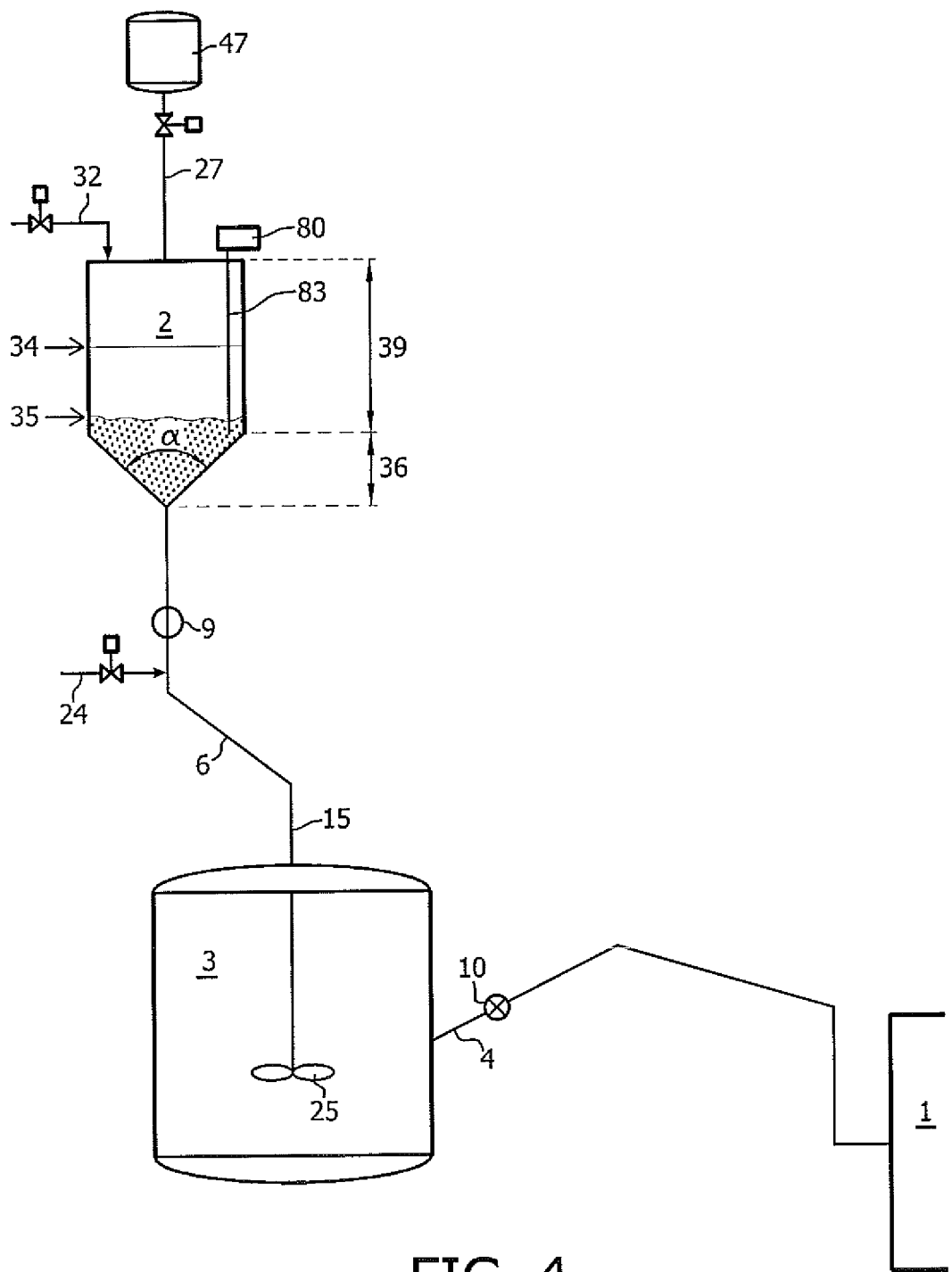
FIG. 4 schematically illustrates a catalyst preparation system for feeding an ethylene polymerization reactor, using a mud pot according to an embodiment of the invention.
Figure 5:
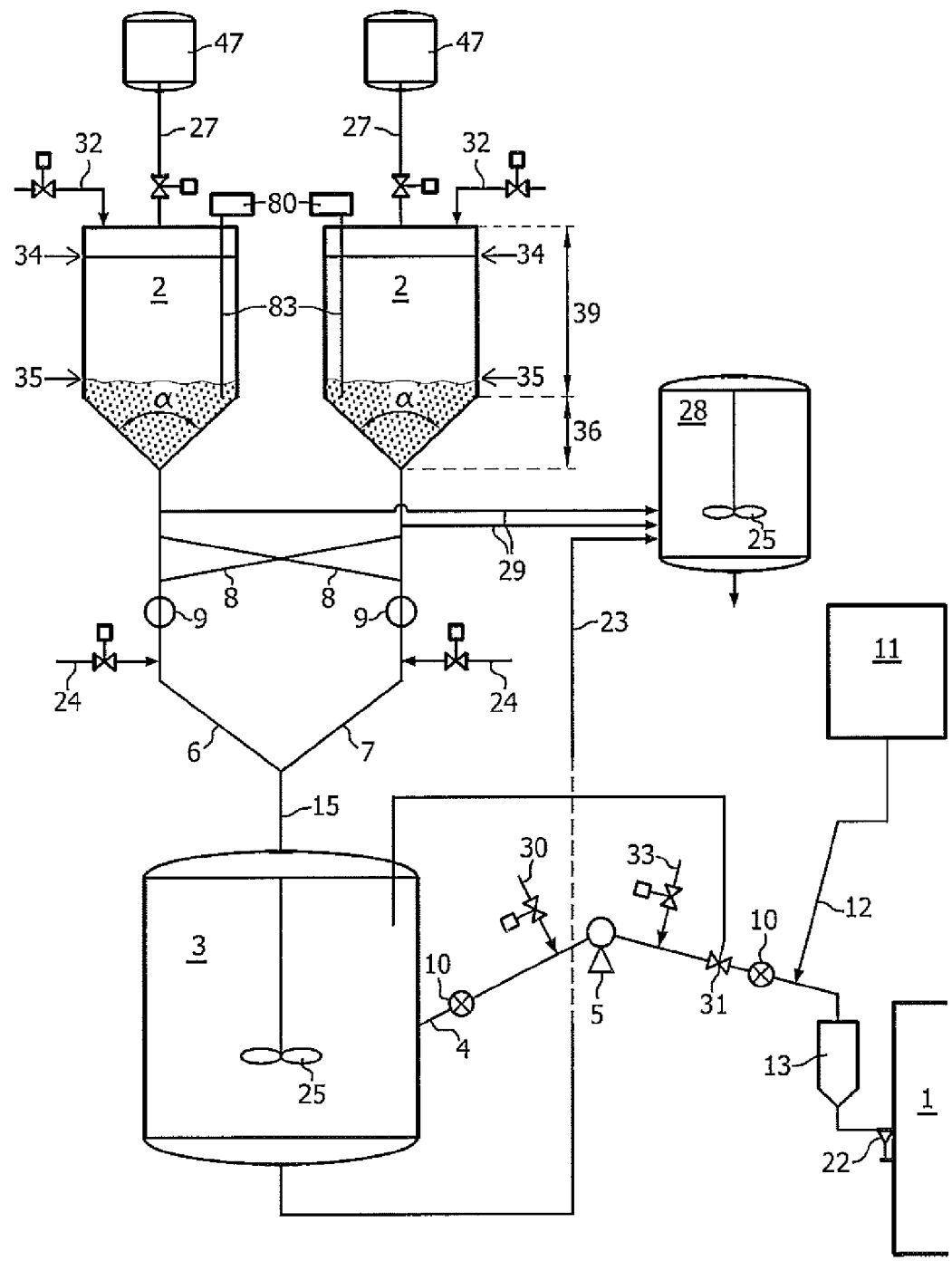
FIG. 5 schematically illustrates a catalyst preparation system for feeding an ethylene polymerization reactor, using two mud pots according to embodiments of the invention.

In FIGS. 4 and 5 preferred embodiments of a device according to the present invention are illustrated. In general with respect to their use in an ethylene polymerization plant, the device according to the invention comprises a mud pot 2 for preparing catalyst slurry and a catalyst supply vessel 47. Preferably the mud pot has a cylindrical body 39 and a frustoconical bottom portion 36.

Preferably a supported catalyst is used; more preferably a metallocene catalyst is used. The metallocene catalyst is solid and is generally provided under a dry form in commercially available packaging.

Preferably pressurizeable catalyst supply containers are used. Pressurizeable containers may be suitable for direct use and coupling to an inlet provided on the mud pot. Use of a larger size pressurizeable container for transportation and supply is therefore preferred. The pressurizeable catalyst supply vessel 47 is preferably suitable for handling pressure levels of between 1.1 and 16 barg, preferably around 10 barg. Purging in such catalyst supply vessel 47 is preferably performed by means of nitrogen and venting to a flare (not illustrated).

According to a preferred embodiment, the metallocene catalyst is provided directly from the catalyst supply vessel 47 in which it was transported to a mud pot 2. In a preferred embodiment, the catalyst can be off-loaded from the container by applying a gravitational force. In other means an outlet opening is provided on said container at the bottom of said container which is suitable for connecting to the inlet opening on said mud pot.

A catalyst slurry is prepared in the mud pot 2. The catalyst slurry comprises solid catalyst in a hydrocarbon diluent. When using a metallocene catalyst, hydrocarbons such as hexane or isobutane can be used to dilute the catalyst and to obtain a catalyst slurry. A major disadvantage of using hexane as diluent to prepare the catalyst is that a portion of hexane generally ends up in the final polymer product, which is undesirable. Isobutane on the other hand is easier to handle, to purify and to re-use in the polymerization process than hexane. For instance, since in the polymerization process of ethylene, isobutane is applied as diluent in the reaction, isobutane used as diluent for the catalyst can easily be re-used in the polymerization process. Therefore, in a preferred embodiment, isobutane is used as diluent for the metallocene catalyst. In a particularly preferred embodiment, pure isobutane is used to prepare the catalyst. Isobutane is generally present in gaseous form at a temperature of about 20° C. and at atmospheric pressure. In other to obtain liquid isobutane for preparing the catalyst slurry, increased pressures need to be obtained. Therefore, the solid catalyst particles are provided to a mud pot 2, and later on to a mixing vessel 3, wherein in the mixing vessel a pressure, preferably comprised between 2 and 16 barg, and more preferably between 3 and 7 barg, and most preferably of 5 barg can be applied. The mixing vessel is kept liquid full.

Still referring to FIGS. 4 and 5, the transfer of the metallocene catalyst from the catalyst supply vessel 47 to the mud pot 2 is preferably done by gravity. Before transferring the metallocene catalyst from the catalyst supply vessel 47 to the mud pot 2, isobutane is admitted into the mud pot 2. The mud pot 2 is provided with an inlet 32 for supply of this diluent. The diluent is filled in the mud pot 2, and the catalyst supply vessel 47 is emptied. To avoid catalyst remains in the catalyst supply vessel 47, the vessel is flushed with isobutane, such that remaining catalyst is transferred to the mud pot 2. The mud pot 2 is not agitated by means of stirring or mixing means to allow the metallocene catalyst to settle.

Maximal concentrated catalyst slurry is obtained when catalyst is settled in diluent. Preparing settled, thus highly concentrated catalyst slurry enables the use of small sized mud pots keeping investment expenditures limited.

After sedimented metallocene catalyst slurry has been prepared in the mud pot 2, the catalyst slurry is transferred from the mud pot 2 to the mixing vessel 3. The transfer can take place manually or automatically. Preferably the transfer of catalyst slurry from the mud pot 2 to the mixing vessel 3 is performed by means of conduits 6, 7, 8, 15 preferably controlled by transfer means 9. Said transfer means preferably comprise a metering valve 9. Preferably the conduits are provided with diluent flushing means 24. The mixing vessel is provided with a stirrer 25.

The catalyst slurry level in the mud pot 2 is determined by a Time Domain Reflectometer 80.

The mud pot 2 is preferably large enough to contain sufficient catalyst slurry and large enough such that a day vessel capacity is equivalent to the time to prepare a new batch. This enables to assure the continuous production and availability of the catalyst in the polymerization reaction. In addition, in another preferred embodiment, the pressure in the mud pot 2 is preferably maintained below the reaction pressure, preferably between 4 barg and 16 barg, more preferably between 7 barg and 11 barg, most preferably around 9 barg.

Referring to FIG. 5, catalyst wastes can be sent through a conduit 29, 23, which is provided with a control valve, to one or more dump vessels 28. The mud pot 2 and the mixing vessel 3 can be emptied in a common or in separate dump vessels 28. Preferably said dump vessel 28 are larger than the mud pot 2 and the mixing vessel 3. In case of the preparation of unsuitable catalyst, these can be emptied from the vessels 2, 3 to these dump vessels 28. The dump vessel 28 is preferably a heated vessel, having a steam jacket, where the diluent, i.e. isobutane, is evaporated. The steam jacket is preferred, for desorbing isobutane from the solid catalyst. The evaporated diluent is sent to a distillation unit or to a flare. In order to avoid the transfer of catalyst fragments when transferring the evaporated diluent, guard filters are provided with the dump vessels. The dump vessels are also provided with pressure controlling means for controlling the pressure in said vessels. The catalyst waste remaining after evaporation of the diluent is removed from the vessels, preferably by means of a draining system, provided at the bottom of the vessel, and the removed waste is discharged into drums and destroyed. The dump vessel is provided with a stirrer 25.

Said catalyst slurry is transferred to a mixing vessel 3 serving as a buffer vessel between the mud pot 2 and a polymerization reactor 1. The catalyst slurry is continuously pumped from the mixing vessel 3 to a reactor 1 through one or more connecting lines 4. The constructional details of valves, pumps etc. have been omitted in the drawings for clarity, it being within the skill of the art to supply these.

Still referring to FIGS. 4 and 5, the metallocene catalyst slurry is subsequently transferred from the mixing vessel 3 to the ethylene polymerization reactor 1 through one or more conduits 4. The conduits 4 preferably have a diameter comprised between 0.3 and 2 cm, and preferably between 0.6 and 1 cm. Each conduit 4 is provided with a pumping means 5, which control the transfer and injection of the metallocene catalyst slurry into the ethylene polymerization reactor 1. In a preferred embodiment, said pumping means 5 are diaphragm pumps. The conduit is further provided with flow meters 10, a two-way valve 31, and diluent flushing means at the inlet 30 and outlet 33 of the pumping means 5. In another preferred embodiment, said reactor 1 is a double loop reactor with two loop reactors connected in series.

In FIG. 5, the catalyst system depicted is further provided with an activating agent distribution system, for bringing a suitable amount of activating agent into contact with the catalyst slurry prior to injection into the reactor 1. It comprises a mud pot for storage of the activating agent 11. It is connected to conduit 4 by means of a conduit 12. The conduit 4 is provided with a contact vessel 13 for enhancing the contact time of the activating agent with the catalyst slurry in the conduits 4. The conduits 4 for transferring catalyst slurry into the reactor are equipped by one or more valves 22, for injecting catalyst into the reactor 1.

The invention claimed is:

1. A method comprising:
preparing a catalyst slurry by introducing a solid catalyst and a liquid diluent in a mud pot, whereby through sedimentation an interface is formed between said liquid diluent and the obtained catalyst slurry, and wherein the catalyst slurry is an ethylene polymerization catalyst slurry; and
monitoring the level of the catalyst slurry in the mud pot by monitoring the level of said interface in the mud pot with Reflectometry using a reflectometer.

2. The method according to claim 1, whereby said Reflectometry is also used for monitoring level of the liquid diluent in said mud pot.

3. The method according to claim 1, whereby electromagnetic pulses are guided into said mud pot by at least two rigid or flexible conductors.

4. The method according to claim 1, whereby said catalyst slurry is transferred to a mixing vessel for diluting said catalyst slurry to a concentration suitable for use in an ethylene polymerization reactor.

5. The method according to claim 1, whereby said solid catalyst is a free-flowing catalyst.

6. The method according to claim 1, whereby said liquid diluent is a hydrocarbon diluent.

7. The method according to claim 1, whereby a pressure of between 4 barg and 16 barg is obtained in said mud pot by blanketing of said catalyst slurry with nitrogen.

8. A method comprising:
introducing a solid catalyst and a liquid diluent into a mud pot and allowing sedimentation of solid catalyst particles to form a catalyst slurry, wherein a solid-liquid boundary is formed between the catalyst slurry and the liquid diluent; and
measuring a level of the solid-liquid boundary in the mud pot with Domain Reflectometry using a reflectometer.

9. The method of claim 8, wherein the Domain Reflectometry is Time Domain Reflectometry or Frequency Domain Reflectometry.

10. The method of claim 8, wherein the Domain Reflectometry is Radar based Time Domain Reflectometry.

11. The method of claim 8, wherein the Domain Reflectometry is Time Domain Reflectometry, wherein the Time Domain Reflectometry comprises measuring electromagnetic energy reflected from the solid-liquid boundary, and wherein the electromagnetic energy has a power of at most 2 Watt.

12. The method of claim 8, further comprising measuring a level of the liquid diluent in the mud pot using Domain Reflectometry.

13. The method of claim 8, wherein the solid catalyst has an angle of repose that is smaller than 38 degrees.

* * * * *